United States Patent Office 3,138,849
Patented June 30, 1964

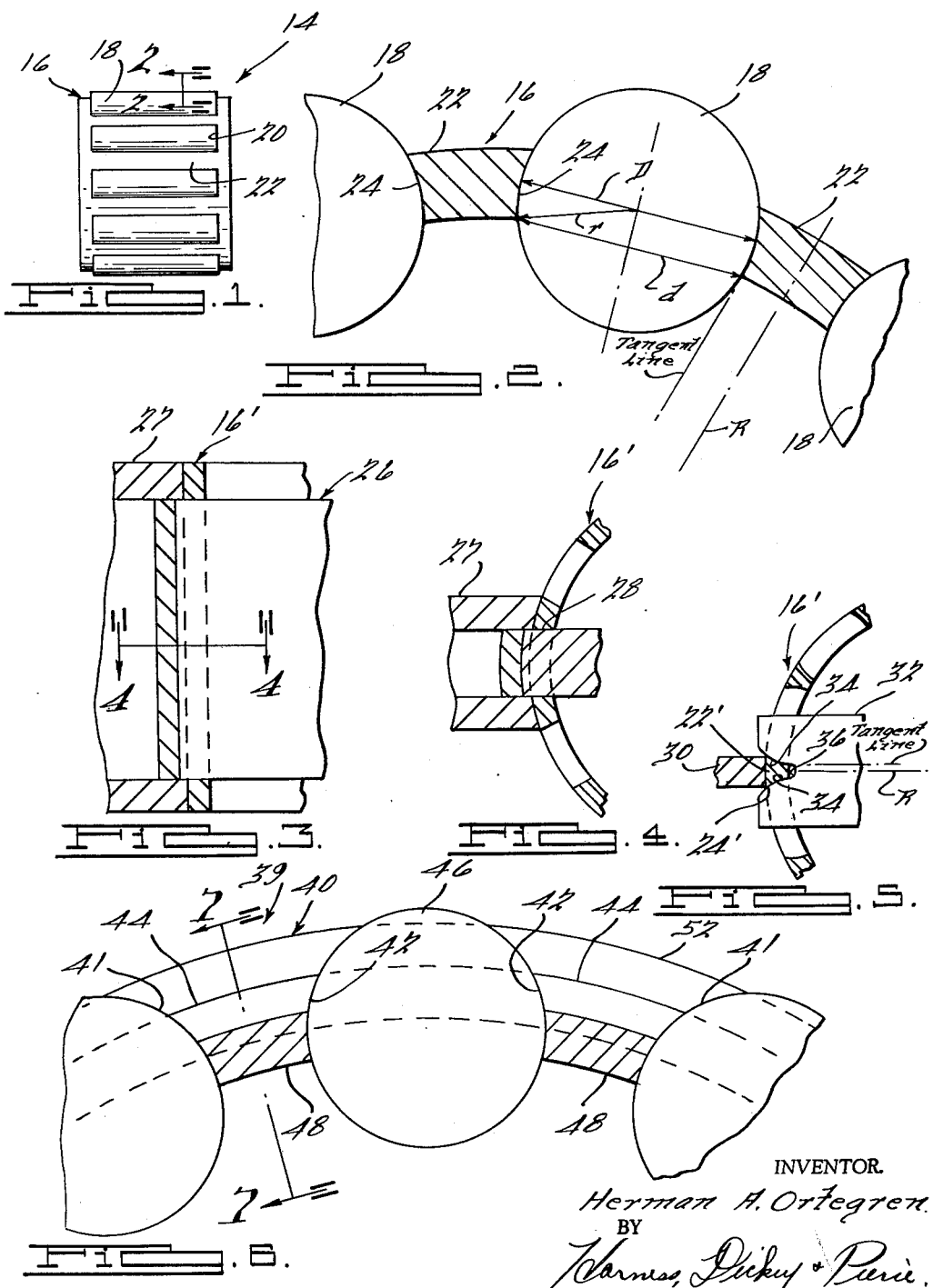

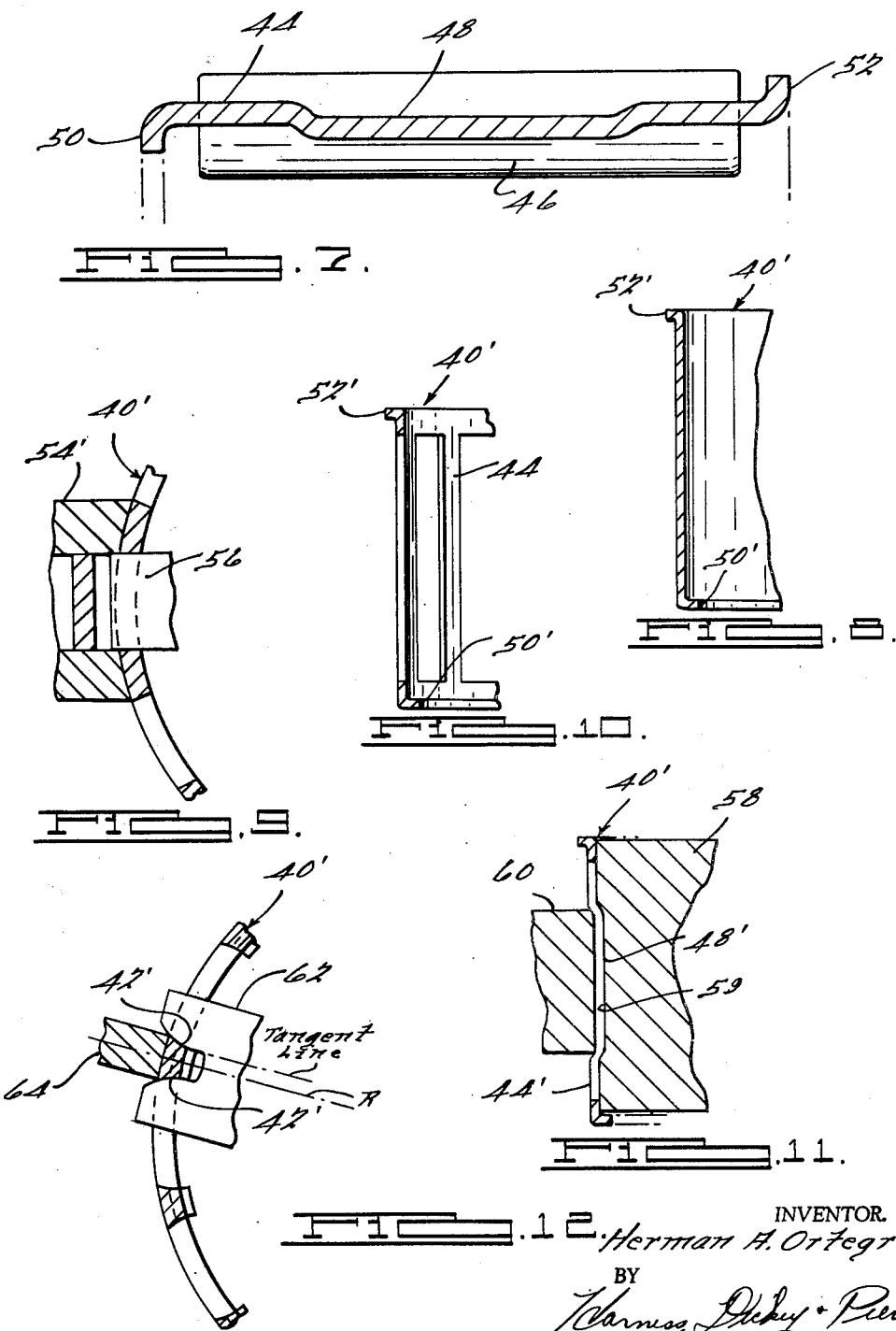

---

3,138,849
METHOD OF MAKING A BEARING
Herman A. Ortegren, Grosse Pointe, Mich., assignor to Federal-Mogul-Bower Bearings, Inc., Detroit, Mich., a corporation of Michigan
Filed Feb. 20, 1962, Ser. No. 174,504
8 Claims. (Cl. 29—148.4)

This invention relates to the method of making roller bearings.

It is common in roller bearing construction to provide a retainer to guide the rollers which retainer rides upon the inner race or outer race. Such contact eventually results in wear of the inner or outer race.

It is advantageous that a retainer for a roller bearing have circular seats conforming to the shape of the rollers in order to maximize the contact area between the rollers and the retainer. It is an object of this invention, then, to provide a novel method for making the retainer in which the retainer has seats which are arcuately contoured to conform to the shape of the roller.

In order to retain the rollers to the retainer for purposes of shipping, assembly, etc., it is common practice that the ends of the roller be indented and the edge of the retainer ring be upset on either side to form portions which project into the depressions in the ends of the roller. Along the same line, it is common practice that, in the assembly of the rollers to the retainer rings, the ring must be staked or otherwise upset after the rollers have been placed in the pockets to maintain the rollers to the ring for purposes of shipping, assembly, etc. Also in some bearing constructions multiple piece bearing retainers are used to maintain the rollers. It is an object of this invention to provide a novel method for making a one-piece retainer in which the rollers can be snapped into the pockets of the retainer either from the inside or from the outside and be retained therein without further staking or upsetting operations.

It is another object of this invention to provide a novel method for manufacturing the retainer rings of this invention.

Other objects, features, and advantages of the present invention will become apparent from the subsequent description and the appended claims, taken in conjunction with the accompanying drawings, in which:

FIGURE 1 is a front elevational view of one embodiment of a retainer ring and roller assembly embodying the features of this invention;

FIG. 2 is a fragmentary sectional view of the retainer ring and roller assembly of FIGURE 1 taken substantially along the line 2—2;

FIG. 3 is a fragmentary view which depicts one step of a novel method of manufacturing the retainer ring shown in FIGURES 1 and 2;

FIG. 4 is a view of the same step as shown in FIGURE 3 taken substantially along the line 4—4 in FIGURE 3;

FIG. 5 is a view depicting another step in the method of manufacturing the retainer ring shown in FIGURES 1 and 2;

FIG. 6 is a fragmentary sectional view of a modification of the retainer ring and rollers as shown in FIGURES 1 and 2;

FIG. 7 is a sectional view of the bearing cage and roller assembly of FIGURE 6 taken substantially along the line 7—7;

FIG. 8 is a fragmentary sectional view which shows the construction of a retainer ring after one step in the method of manufacturing the retainer ring as shown in FIGURES 6 and 7;

FIG. 9 is a fragmentary view with some parts shown in section depicting another step in the method of manufacturing the retainer ring shown in FIGURES 6 and 7;

FIG. 10 is a fragmentary sectional view of a retainer ring after the step shown in FIGURE 9;

FIG. 11 is a fragmentary view with some parts shown in section depicting another step in the formation of the bearing cage shown in FIGURES 6 and 7; and FIG. 12 is a fragmentary view with some parts shown in section depicting the final step in the manufacture of the bearing cage shown in FIGURES 6 and 7.

Looking now to FIGURE 1, a retainer ring and roller assembly is generally designated by the numeral 14 and is comprised of a generally tubular cage or retainer ring 16 and a plurality of equally spaced roller members 18 which can be provided with flat end surfaces (FIGURE 2) and need not be formed with depressions therein for retaining purposes as will be presently seen. The rollers 18 are retained in pockets 20 defined by a plurality of spaced ribs 22 which pockets 20 are of a width slightly greater than the width of rollers 18 for clearance purposes. Each of the ribs 22 is formed on opposite circumferential sides with a face 24 having a profile which is the arc of a circle having a radius ($r$, FIGURE 2) substantially equal to the radius of the rollers 18. The ribs are circumferentially spaced with confronting ones of the faces 24 having a cross-sectional profile substantially defining portions of a circle having a diameter substantially equal to the diameter of the roller members 18; of course, some clearance is provided as dictated by proper design techniques. By providing the oppositely facing seats 24 on adjacent ribs 22 of such an arcuate shape, the rollers 18 are provided with a maximum bearing surface or area of contact with those seats 24.

With the ribs 20 constructed as described above the linear distance between the radially innermost edges on oppositely facing confronting surfaces 24 is just slightly less than the diameter of the rollers 18. The slight interference can be selected to be such that the rollers 18 can be readily snapped into the pockets 20 from the inside of the cage or retainer ring 16. Similarly, by providing the proper interference between the outermost edges of confronting arcuate surfaces 24 on adjacent ribs 22, the roller 18 can be snapped into the pocket 20 from the outside of the retainer ring 16. For a purpose to be seen, the inside diameter of the retainer ring 16 or of the rib 22 relative to the radius of the arc of surfaces 24 is provided such that the radially innermost edge of the arcuate surfaces 24 does not extend beyond a point of tangency of that arcuate surface with a line parallel (Tangent Line, FIGURE 2) to a radius line R from the center of the retainer ring 16 which is the perpendicular bisector of that rib 22. By geometric definition the arcuate surface 24 can be tangent to only one such parallel line.

It can be readily seen, looking to FIGURE 2 that, with the arcuate surface 24 terminating at a point not beyond the point of tangency of that surface with the line parallel to the radius line R of the cage 16, the linear distance $d$ between confronting terminating edges will be less than the diameter D of the roller 18 thus providing an interference fit. The inside radius of the retainer ring 16, or at least of the rib portions 22, can be increased to a point where the linear distance $d$ between confronting terminating edges is just less than the diameter D of the roller 18 and still provide an interference fit. As previously noted, this interference fit is selected to be just sufficient whereby the rollers 18 can be snapped into the pockets 20. Since the retainer ring 16 is made of a resilient material, once the rollers 18 have been snapped past the radially innermost edges of the arcuate surfaces 24 into the pockets 20, the ribs 22 resiliently return to the original position providing an interference such that the rollers 18 cannot fall out from the retainer ring 16. Thus the desired interference fit can be provided simply by selecting the proper inside or outside diameter of the retainer 16 relative to the diameter of the rollers 18.

With the above described construction, the retainer ring 16 can be held by the rollers 18 out of contact with either the inner or outer race (not shown) of the bearing assembly, into which the roller and retainer ring assembly 14 is used.

The retainer ring 16 is made by a novel method as depicted in FIGURES 3, 4 and 5. In the formation of the retainer ring 16 ordinary tube stock of the desired outside diameter, inside diameter, and thickness can be utilized. In the first step, the tube stock is cut to proper length to form a blank 16'. Alternatively, the blank 16' may also be formed from flat stock to a cup and the bottom punched out to produce the same size blank as made from tubing. Next a plurality of slots are formed therein by the use of a die assembly located on opposite surfaces of the one-piece blank 16'. A punch member 26 of a generally rectangular shape and formed with straight sides is located internally of the blank 16' and is moved radially outwardly towards an externally disposed stationary female die 27 to punch out a segment of blank 16' to thus peripherally form a plurality of slots. Thus as shown in FIGURE 4 a plurality of slots are formed having confronting surfaces which are parallel to each other while adjacent oppositely facing surfaces are inclined radially inwardly relative to each other.

After the slots have been formed in blank 16', as shown in FIGURES 3 and 4, each rib is swaged simultaneously on opposite surfaces. Looking now to FIGURE 5, a backup die 30 is disposed on the radially outside of each rib 22' of blank 16' and a swaging die 32 located radially internally is moved radially outwardly along a radius line (R, FIGURE 5) bisecting that rib 22' being swaged to form on opposite surfaces of each rib 22', a surface 24' having a profile which is an arc having a radius substantially equal to the radius of the roller 18 to be utilized. The swaging die 32 is provided with a pair of swaging surfaces 34 which are disposed on opposite sides of a cavity 36 and which surfaces 34 are of the desired arcuate shape.

In order to allow the swaging die 32 to be removed from the rib 22' after the swaging operation, the cavity 36 must be provided such that the arcuate surfaces 34 define a suitable draft with respect to the line of motion of the movable die. This can be insured by providing that the innermost edge of the arcuate surface 24 as swaged does not extend beyond the point of tangency of that surface with a line parallel (Tangent Line, FIG. 5) to the line of motion of the swaging die 32. By geometric definition the arcuate surface 24' is tangent to only one such parallel line and this parallel line corresponds to the line parallel to radius line R discussed with reference to FIGURE 2. Looking to FIGURES 2 and 5, it can be seen then that with such a construction a die member 32 can then be readily removed from the rib 22' after the swaging operation has been completed.

As previously discussed, by providing the proper interference fit (dimension d relative to diameter D of the roller 18) the rollers 18 can be disposed within the retainer ring 16 and moved radially outwardly and snapped into the pockets 20 formed by the method shown in FIGURES 3 and 5 and as described above. Also, the ring 16 can be constructed such that the rollers 18 can be snapped from the outside of the ring into the pockets 20 simply by varying the thickness of the ribs 22 or outside diameter of ring 16 and by controlling the interference between the outermost edges of confronting surfaces 24 relative to the diameter D of the rollers 18. Thus by a proper selection of the inside or outside diameter of the retainer ring 16 relative to the diameter of the rollers 18, the proper interference fit can be attained whereby the roller can be snapped into and retained within the pockets 20.

Note then that with the retainer ring 16 formed as shown and described, the rollers 18 can be snapped into pockets 20 and can be retained therein by means of the interference fit without the necessity of an additional staking or upsetting operation. In this connection then with rollers 18 retained by the interference fit with the pockets 20 of the retainer 16, the ends of the rollers 18 need not be formed with indentations to accept projections from the retainer ring.

Utilizing the concepts of construction as previously defined, a roller bearing cage can be made of a lighter gauge material by making the cage construction as shown in FIGURES 6 and 7. Looking now to FIGURE 6, a bearing cage and roller assembly 39 has a retainer ring 40 which is formed with a plurality of pockets 41 having confronting arcuate surfaces 42 formed on adjacent ribs 44 having a profile which is an arc having a radius substantially equal to the radius of the rollers 46 which are disposed within the pockets 41. The ribs 44 of the retainer 40 have a centrally disposed portion 48 (FIGURE 7 which is depressed radially inwardly with respect to the remainder of the rib 44.

Looking now to FIGURE 6, the arcuate surface 42 of the rib 44 including depressed portion 48 has a composite profile of the arc previously discussed. The depressed portion 48 defines the radially innermost portion of the seat for the roller 46 and the nondepressed portions of the rib 44 define the radially outermost portions of the seat for the rollers 46. The depressed portions 48 contribute an additional function of providing additional resistance to bending of the cage 40. Thus it can be appreciated then that by so depressing the ribs 44 the cage 40 can be made of a lighter gauge material. In order to provide additional resistance to bending of the light gauge cage 40, a pair of oppositely radially extending flanges 50 and 52 can be provided on either side of the cage 40 (FIGURE 7).

For the same purpose as mentioned with regard to the embodiments shown in FIGURES 1 and 2, the radially innermost edges of the arcuate surfaces 42 on depressed portions 48 are formed to have the same geometric and dimensional relationship with respect to each other and to the rollers 46 as the innermost edges of the arcuate surfaces 24 have to each other and to the rollers 18 in the embodiment shown in FIGURES 1 and 2.

The cage 40 shown in embodiments in FIGURES 6 and 7 can be made in a manner similar to that of the cage 16 shown in FIGURES 1 and 2 and as described in conjunction with FIGURES 3, 4 and 5. The bearing cage 40 is made out of a single piece of tubing 40' of the proper length and desired thickness and having the desired inside and outside diameters. In a first step, the flanges 50 and 52 are formed or turned to give the blank 40' an appearance as shown in FIGURE 8. As previously mentioned, the blank 40' may also be formed from flat stock to a cup and the bottom punched out to produce the same size blank as made from tubing. Next, a plurality of slots for the pockets are formed by the use of a punching die (FIGURE 9) which is comprised of a female or backup member 54 and a male or punch member 56. The die members 54 and 56 are of generally the same configuration as the die members 24 and 28 of FIGURE 4 and perform the same functions as described therein.

Looking now to FIGURE 10, a fragmentary view is shown of the bearing cage or retainer 40 after the flanges 50 and 52 have been turned or formed and after the plurality of slots have been formed therein.

In the next step a center portion of the ribs 44' formed by the punching operation as shown in FIGURE 9 and as described above is depressed radially inwardly to form a radially inward portion 48'. Looking now to FIGURE 11, this step is accomplished by means of a female die member 58 disposed internally within retainer ring 40 and by means of a male die or punch 60 disposed outside of the retainer ring 40. The female member 58 is provided with a recess 59 having a shape to facilitate the formation of the depressed portion 48′ while the punch 60 is of a shape to force the material of the rib 44′ into the recess 59. In this step then the male member 58′ is moved radially inwardly to depress the rib 44′ radially inwardly to form the depressed center portion 48′. After the above step has been completed, the entire rib 44 including the radially inwardly depressed portion 48 is swaged to form the arcuate seats 42′ by means of a female die 62 and a backup or male die 64. The female die 62 and the backup die 64 are similar in construction and operation to the female die 32 and backup die 30 as shown in FIGURE 5 and as previously described except that the male die 64 has a shape conforming to the shape of the rib 44′ including the depressed portion 48′. Thus in the swaging operation as shown in FIGURE 12, the same relationship of the arcuate seat 42′ with respect to the die member 62 exists as in the case of the arcuate seat 24′ with respect to the die member 32, thus providing the proper draft whereby die member 62 can be retracted from the rib 44′ after the swaging operation has been completed, i.e. the arcuate surface 42′ extends radially inwardly no further than the point of tangency of the arc with a tangent line (FIGURE 12) which is parallel to a radius line (R, FIGURE 12) which bisects that rib 44′ and along which radius line the rib 44′ is swaged.

Note that after the swaging operation, the entire rib 44′ has a composite arcuate surface 42′ defined by the depressed portion 48′ and the nondepressed portion of the rib 44′ such that the nondepressed portion retains the roller 46 from moving radially outwardly while the depressed portion 48′ retains the roller 46 from moving radially inwardly.

By properly selecting the interference or relationship of the linear distance between the radially innermost edges of confronting surfaces 42′ of the depressed portion 48′ with regard to the diameter of the rollers 46, the rollers 46 can be snapped into the pockets 41′ defined by adjacent ribs 44′ by simply disposing the rollers on the inside of the bearing cage 40′ and moving them radially outwardly into the pockets 41′. Likewise, by providing the proper interference or relationship of the linear distance between the radially outermost edges of the nondepressed portion of the ribs 44′ with regard to the diameter of the rollers 46, the rollers can be snapped into the pocket from the outside of the bearing cage 40. As previously mentioned the desired interference fit is provided by selecting the proper inside or outside diameter of the ribs 44′ of the retainer 40′ relative to the diameter of the rollers 18.

With the retainer and roller assembly 39 as shown in FIGURES 6 and 7 including the retainer 40 as described above and as made by the steps shown in FIGURES 8 through 12, the retainer ring 40 rides upon the rollers 46 and thus need not contact either the inside or outside races of the bearing assembly in which the assembly 39 is used.

Note that in both embodiments the bearing retainers 16 and 40 are constructed of a resilient material such that after the rollers are snapped past the inner or outermost edges, depending upon the design, into the pockets, the edges resiliently move back to their original position to thereby retain the rollers in the pockets.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a bearing assembly comprising a plurality of roller members and a tubular one-piece bearing retaining member having a plurality of axially extending circumferentially spaced ribs with confronting surfaces on adjacent ones of the ribs defining a plurality of pockets for retaining the roller members, each of the surfaces on each of the ribs having a profile the shape of an arc having a radius substantially equal to the radius of the roller members, the method of manufacturing the bearing retainer member comprising the steps of punching a plurality of circumferentially spaced axially extending slots peripherally about a tubular blank to form thereby a plurality of axially extending ribs, and swaging simultaneously along a radius line bisecting each rib oppositely facing surfaces on each rib to form thereon a profile the shape of an arc having a radius substantially equal to the radius of the roller members.

2. The method of claim 1 with the first step being punching a plurality of equally spaced slots to extend along a bearing retainer blank to form thereby a plurality of axially extending ribs, and, with the punched, bearing retainer blank in a tubular form, the second step being swaging simultaneously along a radius line bisecting each rib oppositely facing surfaces on each rib to form thereon a profile the shape of an arc having a radius substantially equal to the radius of the roller members.

3. In a bearing assembly comprising a plurality of roller members and a tubular one-piece bearing retaining member having a plurality of axially extending circumferentially spaced ribs with confronting surfaces on adjacent ones of the ribs defining a plurality of pockets for retaining the roller members, each of the surfaces on each of the ribs having a profile the shape of an arc having a radius substantially equal to the radius of the roller members, the method of manufacturing the bearing retainer member and assembling the rollers therein comprising the steps of cutting from tubular stock a tubular blank having a preselected inside diameter relative to the radius of the roller members, punching a plurality of circumferentially spaced axially extending slots peripherally about a tubular blank to form thereby a plurality of axially extending ribs, swaging simultaneously along a radius line bisecting each rib oppositely facing surfaces on each rib to form thereon a profile the shape of an arc having a radius substantially equal to the radius of the roller members and to form at the radially innermost side of confronting ones of the surfaces a preselected interference fit relative to the roller members, and locating the plurality of rollers radially internally of the retainer ring and moving the rollers radially outwardly past the interference of the confronting surfaces and into the slots.

4. In a bearing assembly comprising a plurality of roller members and a tubular one-piece bearing retaining member having a plurality of axially extending circumferentially spaced ribs with confronting surfaces on adjacent ones of the ribs defining a plurality of pockets for retaining the roller members, each of the surfaces on each of the ribs have a profile the shape of an arc having a radius substantially equal to the radius of the roller members, the method of manufacturing the bearing retainer member and assembling the rollers therein comprising the steps of cutting from tubular stock a tubular blank having a preselected outside diameter relative to the radius of the roller members, punching a plurality of circumferentially spaced axially extending slots peripherally about a tubular blank to form thereby a plurality of axially extending ribs, swaging simultaneously along a radius line bisecting each rib oppositely facing surfaces on each rib to form thereon a profile the shape of an arc having a radius substantially equal to the radius of the roller members and to form at the radially outermost side of confronting ones of the surfaces a preselected interference fit relative to the roller members, and locating the plurality of rollers radially externally of the retainer ring and moving the rollers radially inwardly past the interference of the confronting surfaces and into the slots.

5. In a bearing assembly comprising a plurality of roller members and a tubular one-piece bearing retaining member having a plurality of axially extending circumferentially spaced ribs with confronting surfaces on adjacent ones of the ribs defining a plurality of pockets for retaining the roller members, each of the surfaces on each of the ribs having a profile the shape of an arc having a radius substantially equal to the radius of the roller members, the method of manufacturing the bearing retainer member comprising the steps of punching a plurality of circumferentially spaced axially extending slots peripherally about a tubular blank to form thereby a plurality of axially extending ribs, and swaging simultaneously along a radius line bisecting each rib oppositely facing surfaces on each rib to form thereon a profile the shape of an arc having a radius substantially equal to the radius of the roller members, and with the arc of each surface terminating at its radially innermost side at a point not beyond the point of tangency of that arc with a tangent line which is parallel to the radius line bisecting that rib.

6. In a bearing assembly comprising a plurality of roller members and a tubular one-piece bearing retaining member having a plurality of axially extending circumferentially spaced ribs with confronting surfaces on adjacent ones of the ribs defining a plurality of pockets for retaining the roller members, each of the surfaces on each of the ribs having a profile the shape of an arc having a radius substantially equal to the radius of the roller members, the method of manufacturing the bearing retainer member comprising the steps of punching a plurality of circumferentially spaced axially extending slots peripherally about a tubular blank to form thereby a plurality of axially extending ribs, permanently depressing a portion of each rib radially inwardly and swaging simultaneously along a radius line bisecting each rib oppositely facing surfaces including that portion on the depressed portion of each rib to form thereon a composite profile the shape of an arc having a radius substantially equal to the radius of the roller members.

7. In a bearing assembly comprising a plurality of roller members and a tubular one-piece bearing retaining member having a plurality of axially extending circumferentially spaced ribs with confronting surfaces on adjacent ones of the ribs defining a plurality of pockets for retaining the roller members, each of the surfaces on each of the ribs having a profile the shape of an arc having a radius substantially equal to the radius of the roller members, the method of manufacturing the bearing retainer member comprising the steps of punching a plurality of circumferentially spaced axially extending slots peripherally about a tubular blank to form thereby a plurality of axially extending ribs, and permanently depressing a portion of each rib radially inwardly and swaging simultaneously along a radius line bisecting each rib oppositely facing surfaces including that portion on the depressed portion of each rib to form thereon a composite profile the shape of an arc having a radius substantially equal to the radius of the roller members and with that portion of the arc or the depressed portion of each rib terminating at its radially innermost side at a point not beyond the point of tangency of that arc with a tangent line which is parallel to the radius line bisecting that rib.

8. In a bearing assembly comprising a plurality of roller members and a tubular one-piece bearing retaining member having a plurality of axially extending circumferentially spaced ribs with confronting surfaces on adjacent ones of the ribs defining a plurality of pockets for retaining the roller members, each of the surfaces on each of the ribs having a profile the shape of an arc having a radius substantially equal to the radius of the roller members, the method of manufacturing the bearing retainer member comprising the steps of forming a pair of oppositely radially extending flanges at each end of a tubular blank punching a plurality of circumferentially spaced axially extending slots peripherally about the tubular blank to form thereby a plurality of axially extending ribs, and permanently depressing a portion of each rib radially inwardly and swaging simultaneously along a radius line bisecting each rib oppositely facing surfaces including that portion on the depressed portion of each rib to form thereon a composite profile the shape of an arc having a radius substantially equal to the radius of the roller members and with that portion of the arc or the depressed portion of each rib terminating at its radially innermost side at a point not beyond the point of tangency of that arc with a tangent line which is parallel to the radius line bisecting that rib.

References Cited in the file of this patent

UNITED STATES PATENTS

| | | |
|---|---|---|
| 2,611,670 | Palmgren | Sept. 23, 1952 |
| 2,657,106 | Lovell | Oct. 27, 1953 |
| 2,765,518 | Lovell | Oct. 9, 1956 |
| 2,774,132 | Squire | Dec. 18, 1956 |